US012639279B2

(12) United States Patent
Titus et al.

(10) Patent No.: US 12,639,279 B2
(45) Date of Patent: May 26, 2026

(54) METADATA DETERMINATION AND STORAGE METHOD

(71) Applicant: Royal Bank of Canada, Toronto (CA)

(72) Inventors: Jinoj Titus, Toronto (CA); Tony Augruso, Toronto (CA); Nada Kuruzar, Toronto (CA); Ajay Joy, Toronto (CA); Charles Leung, Toronto (CA); Priyanka Ray, Toronto (CA); Ruqi Wang, Toronto (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 18/924,532

(22) Filed: Oct. 23, 2024

(65) Prior Publication Data

US 2025/0217341 A1     Jul. 3, 2025

Related U.S. Application Data

(60) Provisional application No. 63/616,042, filed on Dec. 29, 2023.

(51) Int. Cl.
*G06F 16/00*          (2019.01)
*G06F 16/22*          (2019.01)
*G06F 16/2457*        (2019.01)

(52) U.S. Cl.
CPC .... *G06F 16/2237* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 11,947,912 | B1 * | 4/2024 | Dong | G06F 40/284 |
| 12,086,713 | B2 * | 9/2024 | De Freitas Adiwardana | |
| | | | | G06N 3/08 |
| 12,412,077 | B2 * | 9/2025 | Mondlock | G06N 3/0475 |
| 2024/0203404 | A1 * | 6/2024 | Shabat | G10L 15/1815 |
| 2024/0303421 | A1 * | 9/2024 | Fabian | G06F 40/40 |
| 2024/0303440 | A1 * | 9/2024 | Fabian | G06F 40/18 |
| 2024/0362417 | A1 * | 10/2024 | Imani | G06N 3/09 |
| 2024/0403373 | A1 * | 12/2024 | Chao | G06F 16/9538 |
| 2024/0412004 | A1 * | 12/2024 | Manikandan | G06F 40/30 |
| 2024/0428783 | A1 * | 12/2024 | Gupta | G06F 40/216 |
| 2025/0068665 | A1 * | 2/2025 | Chandel | G06F 16/3347 |
| 2025/0181899 | A1 * | 6/2025 | Ajmera | G06N 3/0475 |
| 2025/0217341 | A1 * | 7/2025 | Titus | G06F 16/2237 |
| 2025/0217753 | A1 * | 7/2025 | Makhija | G06Q 10/06315 |

* cited by examiner

*Primary Examiner* — Hasanul Mobin

(57)          ABSTRACT

Methods, systems, and techniques for metadata determination and storage. A large language model that is implemented using at least one artificial neural network receives an initial prompt that includes a query related to the metadata. The metadata is in respect of data that is part of a dataset, and the initial prompt includes context for the query. The large language model determines the metadata in response to the query using the context. Once determined, the metadata is stored in the dataset such that the metadata is associated with the data to which it relates.

20 Claims, 10 Drawing Sheets

602 Receive prompt

604 Process/modify prompt

606 Receive additional prompts

608 Process/modify prompts

610 Multishot learning

612 Generate vector

614 Retrieve context

616 Augment prompt

618 Multishot learning

620 Generate metadata

624 Store/write metadata

METADATA DETERMINATION AND STORAGE METHOD

CROSS-REFERENCE TO RELATED APPLICATIONS

The present application claims priority to U.S. provisional patent application No. 63/616,042, filed on Dec. 29, 2023 and entitled, "METADATA DETERMINATION AND STORAGE METHOD", the entirety of which is hereby incorporated by reference herein.

TECHNICAL FIELD

The present disclosure is directed at methods, systems, and techniques for metadata determination and storage.

BACKGROUND

Metadata, particularly in the business context, can provide context and meaning to large datasets. Problematically, large datasets often comprise at least thousands of different types of data, and manual metadata population is extremely onerous in terms of the time required to generate the requisite volume of metadata and the knowledge required to generate high quality metadata. Given difficulties such as the diversity of metadata types and contexts in which metadata arises, generating that metadata can also be technically challenging.

SUMMARY

According to a first aspect, there is provided a method for metadata determination and storage, the method comprising: receiving, at a large language model implemented using at least one artificial neural network, an initial prompt comprising a query related to the metadata, wherein the metadata is in respect of data comprising part of a dataset and wherein the initial prompt comprises context for the query; determining, using the large language model and the context, the metadata in response to the query; and storing the determined metadata in the dataset such that the metadata is associated with the data.

The prompt may comprise at least one placeholder, and the method may further comprise: generating a query vector from the query using the large language model; retrieving the context from a vector database, wherein the retrieving comprises performing a similarity search on the vector database relative to the query vector; augmenting the initial prompt using the retrieved context to create an augmented prompt; and inputting the augmented prompt to the large language model, wherein the metadata is determined in response to the augmented prompt.

The similarity search may comprise a cosine similarity search or a nearest neighbor search.

The prompt may comprise at least one of business name, business description, or business rules, and the metadata may be determined by text generation.

The prompt may comprise at least one of business terms, data classifications, or whether the data is subject to legal regulations, and the metadata may be determined by text matching.

The prompt may be received via an application programming interface.

The prompt may be received via a textual chat interface.

The initial prompt may be one of multiple prompts received by the large language model, and multishot learning may be performed using the multiple prompts. Alternatively, multishot learning may be performed within the initial prompt.

The data may be stored in a spreadsheet, and the generated metadata may be stored in a cell of the spreadsheet.

The generated metadata may describe a data entry in the cell of the spreadsheet, and the metadata may be stored by overwriting the data entry.

According to another aspect, there is provided a method for generating metadata for data population, the method comprising: receiving, at a large language model implemented using at least one artificial neural network, a prompt comprising a query for generating the metadata, wherein the metadata is in respect of data comprising part of a dataset and corresponds to information representative of an attribute of the dataset; augmenting the prompt with context comprising metadata descriptors by processing information in the query; determining the metadata in response to the query by processing the augmented prompt and the dataset with the large language model; and storing the determined metadata in relation to the dataset, wherein the metadata is stored in association with the data and the attribute.

Supplementing the method may comprise modifying the prompt to comprise at least one placeholder corresponding to a type of the metadata to be determined by the large language model.

Each placeholder of the at least one placeholder may be associated with respective context data.

The prompt may be modified according to a template comprising information pertaining to the metadata, the template may correspond to a format of the prompt.

The prompt template may comprise acceptable values for the data and/or definitions for terms associated with the metadata.

Augmenting the prompt may comprise: generating a query vector from the prompt using the large language model; and retrieving the context relevant to the metadata from a vector database comprising context represented as vectors, the retrieving may comprise performing a similarity search on the vector database relative to the query vector.

The similarity search may comprise a cosine similarity search or a nearest neighbor search between the query vector and the context data.

The retrieving may further comprise ranking results of the similarity search.

Supplementing the method may comprise: generating and storing the vectors representing the context in the vector database as to populate the vector database, the context may correspond to metadata and datasets of a particular entity, group, or organization.

The context may comprise example metadata and data associated with a dataset corresponding to the example metadata.

The prompt may comprise at least one of business name, business description, or business rules, and wherein the metadata is determined by text generation, or the prompt may comprise at least one of business terms, data classifications, or whether the data is subject to legal regulations, and wherein the metadata is determined by text matching.

The prompt may be received via an application programming interface or via a textual chat interface.

Supplementing the method mat comprise: identifying one or more missing metadata entries in the dataset; and displaying the identified one or more missing metadata entries for selection by a user for metadata generation.

Determining the metadata may comprise generating a plurality of potential metadata entries for selection by a user as the determined metadata.

The prompt may comprise multiple prompts received by the large language model, wherein multishot learning is performed by the large language model using the multiple prompts.

Multishot learning may be performed by the large language model with the prompt and the context to determine the metadata.

The data may be stored in a spreadsheet, the generated metadata may be stored in a cell of the spreadsheet.

The generated metadata may describe a data entry of a cell or a group of cells in the spreadsheet, the metadata may be stored by overwriting the data entry.

According to another aspect, there is provided a metadata determination and storage system, the system comprising: a vector database; at least one communications interface; and at least one processor communicatively coupled to the at least one communications interface and to the vector database and configured to perform the foregoing methods.

According to another aspect, there is provided at least one non-transitory computer readable medium having stored thereon computer program code that is executable by at least one processor and that, when executed by the at least one processor, causes the at least one processor to perform the foregoing methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
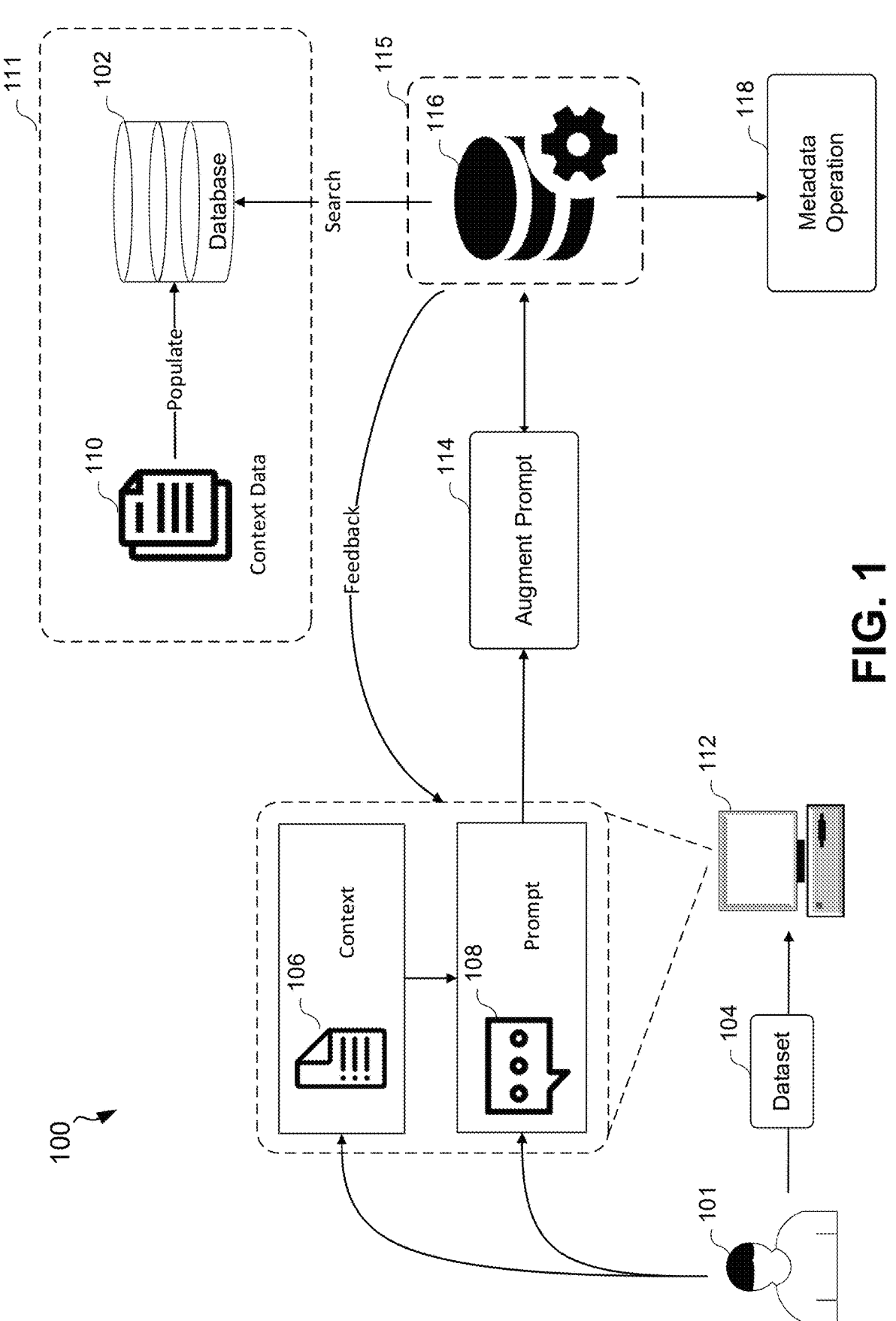
FIG. 1 depicts a method for metadata determination and storage, according to an example embodiment.

Metadata is, at a high level, a type of data that describes other data. Metadata in the business context is referred to as "business metadata" herein. Business metadata may comprise information such as:

1. a business name;
2. a business description;
3. glossary terms (i.e., common words/phrases that are used to define and describe data concepts and entities in the organization running the business);

4. data classification and regulatory metadata, which describe whether the data is subject to specific regulations; and
5. business rules, which govern how data is created, used, and maintained.

Business metadata generally is useful for understanding a dataset that it describes because it can provide context and meaning to that dataset. High quality business metadata accordingly may be useful for:

1. providing clear and consistent definitions of business terms, data elements, acronyms, and abbreviations, which can reduce confusion and errors in data interpretation and decision making (e.g., a glossary entry can explain what a term means in a specific business context);
2. enabling information on the ownership, stewardship, policies, rules, and regulations of data, which can ensure data accountability, compliance, and security (e.g., data quality rules can specify the acceptable values, formats, and standards for data); and
3. providing information on the relationships, associations, and dependencies of data, which can facilitate data integration, discovery, and analysis (e.g., taxonomies can classify and organize data into hierarchical categories and subcategories).

Generating high quality business metadata is difficult to do manually:

1. complexity and diversity of data sources and formats, both on-premises and in the cloud, make it hard to capture and maintain consistent and comprehensive metadata across different data assets;
2. difficulty of capturing and maintaining the business context and semantics of data, require high manual effort and domain expertise;
3. metadata preferably is active and dynamic, and should be continuously discovered, updated, and enriched; and
4. metadata preferably is accessible and usable by different data consumers, such as data analysts, data scientists, data stewards, or data regulators, who may have different needs and expectations for metadata.

The above problems also translate to technical challenges when attempting to generate high quality business metadata using a computer. For example, while intuitively it may seem like large language models (each an "LLM") could easily generate business metadata for large datasets, the diversity of datasets makes training, or even fine-tuning, LLMs for particular datasets very computationally expensive. Apart from the amount of compute required, the wide variety of datasets can also make obtaining training data difficult. Additionally, the wide variety of different data consumers means that a flexible and intuitive interface should be available to permit consumers of different technical skill levels to be able to use any technical solution enabled with an LLM.

At least some embodiments herein are accordingly directed at a metadata determination and storage method. A LLM, which is implemented using at least one artificial neural network, receives an initial prompt comprising a query related to the metadata. The metadata is in respect of data comprising part of a dataset and the initial prompt comprises context for the query. The context may be provided by a user; additionally or alternatively, context may be retrieved from a vector database that stores relevant contextual encodings and an augmented prompt may be generated and input to the LLM. The LLM determines, in response to the query and using the context contained in the prompt, the metadata. This determined metadata is then stored in the dataset such that the metadata is associated with the data. For example, when the determined metadata describes a type of data associated with a non-intuitive column or row heading in a spreadsheet, once determined the metadata may replace that column or row heading such that the resulting spreadsheet is more intelligible to data consumers. The LLM may determine the metadata through freeform text generation (e.g., when the determined metadata need not correspond to any specific value), or through text matching (e.g., when the determined metadata does not to correspond to a specific value, such as "Yes" or "No").

In particular, the LLM may be used for reasoning and to create an action plan with specific objectives. In some aspects, the LLM does not need to be trained or retrained (e.g. with data pertaining to the metadata and data pertaining to a particular organization or entity for which the metadata is generated). That is, a standard or conventional LLM can be used directly without modification, for example by providing the LLM with context information (e.g. context, context data, contextual information, contextual data) that is relevant to the metadata and/or context information associated with the particular organization or entity for which the metadata is generated. Particularly, LLM(s) can be used for semantic reasoning via chain of thought and to generate an execution plan to determine the appropriate metadata output by receiving augmented prompt(s) that are designed based on precise data domains and semantics through the inclusion of context information. The prompt(s) can also be converted into tools and data end points as to decouple planning in customizing the prompt(s) and process flow. Further, by including the context information, it is possible to index relevant data (e.g. to the metadata or particular organization/ entity), to enable the different planners, for example with vector-based database(s).

Referring now to FIG. 1, there is shown a method 100 for metadata determination and storage, according to an example embodiment. Operation 111 comprises performing initialization of a vector database 102 based on context information/data 110. Context information 110 can comprise a plurality of proprietary datasets containing information pertaining to various metadata, such as business metadata. The information comprised in the proprietary datasets may be specific to a particular organization or entity. As an example, the proprietary datasets can comprise data of/from the organization or entity as well as the corresponding metadata thereof. The context information 110 can be used to populate the vector database 102. For example, as more proprietary datasets are received/generated, the vector database 102 can be updated with the additional context information 110.

The vector database 102 may be implemented using the Redis™ platform, and may be a PGVector™ database, which can be an extension of PostgreSQL™. An embedding agent converts data from the proprietary datasets into vectors, which are numerical representations of the data comprised in the datasets. The conversion preserves the meaning and context of the datasets and may be performed using an embedding model such as the Word2Vec embedding model, which produces vectors that are compatible with the LLM used as described below in the method 100, such as the Falcon40B™ LLM, and GPT-3.5 or GPT-4 from OpenAI™. Generally speaking, the embedding model used to generate the vectors is compatible with the LLM used subsequently in the method 100. Alternative embedding models comprise, for example, the Hugging Face™ sentence transformer, primarily for semantic search and information retrieval, as well as text-embedding-03-large from OpenAI™. Regardless of the particular embedding model that the embedding agent applies, the embedding agent groups the proprietary datasets as vectors in the vector database 102 in accordance with particular use case for efficient retrieval.

The vectors have a fixed number of dimensions and capture the semantic meanings and features of the embedded data. In at least some example embodiments, the data that is transformed into vectors comprises:

(a) Business Data Domains. These are groups of related data that should be managed consistently across an enterprise, regardless of what business, functional unit, or region produces, uses, or alters it. Organizing data around domains helps ensure accountability and quality. Example groups of data relate in a financial services enterprise may comprise data on Clients, sales and service, deposits, and lending.

(b) Data Definitions. These are words and phrases that are specific to the field of business and have a common and agreed-upon meaning within an organization. They help to ensure clarity, consistency, and accuracy when communicating and analyzing business data and processes. This is a useful tool for data governance, as it helps to establish a common business vocabulary and avoid confusion and ambiguity among different stakeholders.

(c) Data Subject Areas. These are logical groups of data that are relevant to a specific business process or function, used to logically organize data in an application or for analytics. They help to organize and simplify the underlying data model by dividing it into smaller and more manageable parts. Subject areas can also facilitate communication and collaboration among business analysts, data modelers, and developers, which is different from the Business Data Domains. Subject areas can be created at different levels of abstraction, depending on the purpose and scope of the data model. They can be used in conceptual, logical, and physical data models.

(d) Data Source. This identifies the data's source from within and/or outside of the organization.

(e) Database/Schema. This identifies the database or schema according to which the data is formatted.

(f) Metadata. This specifies the types of metadata applicable to the data set.

The data that is transformed into vectors comprises categories (a)-(f) above, which form the datasets, as well as existing technical column names, metadata descriptors and business descriptions of each of the columns. Table 1 below provides an example of those existing technical column names, description and business descriptions of each of the columns:

TABLE 1

| | | | | | Business Terms from | | |
| Column Name | Data Type | Business Description | Data Classification | Has PII Data | Business Glossary | Business Data Domain | Subject Areas |
| --- | --- | --- | --- | --- | --- | --- | --- |
| id | INT | Unique identifier for each client record | Internal | No | Customer ID | Customer | Party |
| name | VARCHAR(50) | Name of the client | Public | Yes | Customer Name | Customer | Party |
| description | VARCHAR(255) | Brief description of the client and specifies the sector that the client operates, size, location, or other relevant details. | Internal | No | Customer Profile | Customer | Party |
| address | VARCHAR(100) | Address of the client | Confidential | Yes | Customer Address | Customer | Party_details |
| contact_details | VARCHAR(100) | Contact details of the client | Sensitive | Yes | Customer Contact | Customer | Party_details |

In Table 1, the Column Name and Data Type columns are technical definitions of the columns; the Business Description, Data Classification, Has PII Data (e.g. has data comprising personally identifiable information), and Business Terms from Business Glossary columns are business metadata (e.g. to be generated/matched to provide meaning to the data); and the Business Data Domain and Subject Areas columns can be used as context such as business data domains, terms, and subject areas, which can be added into the augmented prompt. In Table 1, "Business Description" (corresponding to column 3) may be considered a metadata type where rows 2 onwards for the column are respectively individual examples of metadata corresponding to the other data of the same row. In some embodiments, a Business Name may also be included (e.g. in a column) as another type of business metadata.

The vectors are stored and indexed in the vector database 102 such that semantic relationships they represent are preserved such as by using clustering or hashing techniques. This allows for faster and more accurate subsequent retrieval of the vectors based on their similarity or distance in the embedding/vector space, as discussed below.

Once populated with vectors in this manner, the vector database 102 may be queried so as to compare a query vector, received by the vector database 102, with the vectors stored in the vector database 102 to attempt to match the query vector to vector(s) in the vector database 102. As described further below, a LLM (e.g. LLM 116) may be used to generate the query vector, and an appropriate similarity search method (e.g., cosine similarity or nearest neighbor search) may be used to rank and return the vector(s) stored in the vector database 102 that has the highest similarity scores based on the query vector. This allows matching of query vectors with vectors stored in the vector database 102 based on intent and context, rather than just on keyword(s). This matching is applied by two different agents, a prompt augmentation agent and a metadata determination agent, described further below. As used herein, metadata "determination" may comprise generating metadata as freeform text using an LLM, retrieving metadata from the vector database 102 (e.g. comprising matching the metadata to a particular term), or both.

Operation 111 is typically performed prior to a user 101 interacting with the system to generate metadata. User interaction begins at operation 112, which is prompt generation. A planning agent controls the user interface and selects a suitable prompt template for an initial and any augmented prompts, as well as a vector group on which to perform a semantic search as described above. A particular dataset 104 (e.g. a particular proprietary dataset, similar to one or more of the plurality of datasets) for which metadata is to be generated (e.g. having missing metadata or inaccurate metadata therein) can be provided to the planning agent and analyzed. In particular, the dataset 104 can have the data structure/form as described above. A prompt 108 may be received from the user 101 (e.g. an indication to generate metadata). The user 101 may specify a particular piece of metadata to be generated or a type thereof (directly or queried by the planning agent). In some embodiments, the metadata may be generated for the particular dataset 104. The planning agent may process the dataset 104 to identify missing metadata (e.g. in the particular dataset), accordingly, the planning agent can generate an action plan (e.g. action flow/process) based on the user prompt or missing metadata. For example, the planning agent can generate a prompt (e.g. modify the prompt 108) based on one of a plurality of prompt templates using the user prompt 108 and/or metadata (e.g. type thereof or metadata identified as missing). Specifically, the planning agent can follow a predetermined/standardized course of action and/or generate a prompt for the system based on a type/category of metadata (e.g. where a particular template/action plan corresponds to a particular metadata type/category).

In some embodiments, the user 101 can interact with the system using the user interface via a user device at operation 112. The user device may be one of a computer, a tablet, a mobile phone, or another appropriate device. The user interface may be implemented as a webpage, an application, or another suitable format. The system may be communicatively coupled to the user device directly or through a communications network (e.g. the internet) or comprise a part of the user device.

Users may interact with the system, and more particularly the LLM 116, in two usage scenarios:

1. Invoking an application programming interface ("API") to interact with the LLM 116. For any dataset that is onboarded to the system (e.g., in a data marketplace), if the business metadata is missing for that dataset or if any data attribute is missing, the system is invoked to populate the missing values. In this context, the user prompt 108 is created differently for each of the missing values separately.
2. Interacting with the engine thru a textual chat interface. Persons who have appropriate authorization to manage the metadata of the dataset (e.g., data owners or data analysts) may manually select or otherwise identify a missing "metadata attribute" (e.g., a missing piece of metadata, or a piece of metadata that is non-intuitively described) and the prompt context is set accordingly. The user may interact with the LLM 116 using a chatbot-type interface.

Ultimately, the goal is to determine missing business metadata; and more specifically, determining metadata for a dataset (e.g. dataset 104). For example, metadata may be determined for a type/group/category of data in the dataset. This may be done at two levels:

1. Level 1—Macro (Dataset/Table level). This provides a high level understanding of what a table contains. For example:
   (a) Client Table
       (i) Business Name: Client Dimension for Retail
       (ii) Business Description: This table contains information about the clients of a company. This also has dependencies on the product and order tables.
2. Level 2—Micro (Column/Data Attribute level). This provides understanding of what each column or data attribute in the table (e.g. of the dataset) contains. For example, for the columns in the above client table example, id, name, description, address, and contact_details are level 2.

The prompt template that the planning agent generates is based on the metadata attribute to be filled. Prompt generation is described further herein. In particular, prompt(s) 108 comprising one or more queries for eliciting a response from the LLM 116 may be generated. The prompt(s) may be a natural language prompt (e.g. a question) or in a particular format (e.g. based on a prompt template), as shown herein. For example, the prompt template may comprise a question for the LLM 116 in a specific structure comprising placeholder(s) referring to information specific to the metadata. The placeholder may correspond to one of a plurality of metadata attributes and may identify a specific dataset from which the metadata is to be generated, a specific type of metadata to be generated, a property of the metadata, as well as acceptable values for the metadata or the data described by the metadata (e.g. a classification such as Yes/No or a numerical value or range of values).

Example metadata attributes can comprise the following, described in respect of the data of the dataset 104:

1. Business Name. This is a contextual name with emphasis on significance of the data from a business perspective.
2. Business Description. This is a brief summary of what the data represents, such as the scope, the objectives, the benefits, or the features of the data.
3. Business Rules. This governs how data is created, used, and maintained.
4. Business Terms. This is part of an enterprise-wide glossary, with common words/phrases that are used to define and describe data concepts and entities. These may be defined by a Chief Data Officer of an organization, for example.
5. Data Classification. This represents different data classification levels. For example, data may be classified as having different levels of confidentiality (e.g., restricted, sensitive, confidential, internal use only, and public).
6. Applicable Regulation. This describes whether the data is subject to specific regulations (e.g., whether the data is personally identifiable information ["PII"] and therefore subject to privacy laws, or is payment card industry data).

Multishot learning may also be added to the prompt 108 to provide a level of determinism to the LLM's output. For example, a single prompt may be augmented by using examples (e.g. in the form of context, as described further herein) as part of a prompt template to facilitate multishot learning. In some embodiments, an example can comprise an example of metadata and data associated with a dataset corresponding to the example metadata. For multishot learning, data context 106 may be added to placeholders in the user prompt. In the case of multiple placeholders, a corresponding piece of context can be associated or added to each placeholder. Different values may be used depending on the nature of the placeholder to be populated. The type of placeholders may comprise, for example, the Business Data Domains, Data Definitions, Data Subject Areas, Data Source, Database/Schema, and Metadata categories as described above. Multishot learning is also described further herein.

The user 101 may also provide additional information regarding the metadata to be determined via additional prompts (e.g. directly or when prompted by the planning agent). For example, based on the type of metadata (e.g. metadata attribute), the planning agent can modify the prompt 108 to include the additional information for the metadata (e.g. according to the action plan). The prompt 108 can be modified to include acceptable values for the data described by the metadata, as well as definitions for terms associated with the metadata. Multishot learning can also be performed on the additional prompts (e.g. with the prompt 108) to facilitate the LLM 116 in determining metadata.

A prompt augmentation agent generates the initial prompt 108 for the LLM 116 based on user prompt input combined with the data context 106. This is enabled by prompt templates that comprise instructions, context 106 and user information, which collectively represent an effective prompting mechanism for the LLM 116. This enables the LLM 116 to follow complex instructions and perform multistep reasoning (i.e., chain-of-thought reasoning), with the data context 106 based on, for example, the data domain, subject area, data repository, database/schema, column names in the dataset, and metadata. For example, the data context 106 can be included in the prompt 108 as example(s) for the LLM 116 to follow.

A prompt augmentation agent may augment the initial prompt 108 to generate an augmented prompt. The initial prompt 108 may be augmented with one or both of the data context 106 and the vectors from the vector database 102 using multishot learning. Performing prompt augmentation comprises using different data sources, a prompt template, and an embedding model:

1. A data source is where the system obtains the data to be used in the initial prompt 108 or the augmented prompt. This may comprise, for example, the proprietary datasets as stored in the vector database 102 and/or the data context 106. Additionally or alternatively, third party data such as data from World Bank Group Finance may be used.

2. A prompt template comprises a prompt written using placeholders to insert data from the data source used to provide context. The placeholders may comprise functions to manipulate data, such as through summarizing, paraphrasing, or generating new content. The system may use two different types of the prompt template: text generation or text matching.

Matching is used for some of the metadata columns such as Data Classification (e.g., Public/Internal/ Confidential/Sensitive). The LLM cannot randomly generate a value here as the value should conform to standard terminology (e.g. a set of terms used by and specific to the particular organization for defining/ representation particular group(s) of data). Matching is also used for Business Terms, which in at least some embodiments are specifically enumerated and for which an exact match is required. In contrast, generation is used for metadata such as business description and summarized names, or more generally any freeform text that can summarize the meaning of the columns. In other words, matching is used when a result selected from a specific list is required. The system can determine, based on the metadata, to utilize text matching or text generation, for example, based on the type of metadata as well as whether the metadata should be restricted to a particular value or should be a natural language text description.

Example prompt templates for each of text generation and text matching are shown below. It should be noted that the prompt template(s) can provide additional information to help LLM 116 in performing metadata determination such as by including descriptions for the type of metadata to be determined, example(s), requirement(s) for the determined metadata, description/requirement(s) for the data described by the metadata, etc.

(a) A prompt template for text generation. As shown below, when the metadata to be determined describes data particular to the dataset 104, text generation may be required. This prompt template comprises fields for:

(i) Business Name. This is the name of the data element or attribute that is used by the business users. It should be clear, concise, and consistent across the organization. For example, Customer Identifier, Product Name, Order Date, etc.

(ii) Business Description. This is a brief explanation of what the data element or attribute represents, how it is derived, and what its purpose is. It should provide enough information for the users to understand the data and its context. For example, Customer Identifier is a unique identifier assigned to each customer who purchases a product or service from the company.

(iii) Business Rules. These are the rules or policies that govern the data element or attribute, such as how it is created, updated, deleted, validated, or transformed. They should be aligned with the business objectives and requirements, and ensure data quality, consistency, and integrity. For example, Customer ID must be a 10-digit numeric value that starts with 1 and does not contain any special characters or spaces.

(b) A prompt template for text matching. As shown below, when the metadata to be determined should adhere to a particular standard format or can be generalized for a plurality of datasets, text matching may be required. This prompt template comprises fields for:

(i) Business Terms. These are the common terms or definitions that are used by the business users to refer to the data element or attribute. They should be standardized and agreed upon by the stakeholders, and documented in a business glossary or dictionary. For example, Customer Identifier is also known as CustomerID, Customer Number, or Customer Key.

(ii) Data Classification. This is the categorization of the data element or attribute based on its sensitivity, confidentiality, or security level. It should indicate who can access, view, modify, or share the data, and what restrictions or controls are applied to the data. For example, Customer ID is classified as Personally Identifiable Information (PII), and requires encryption, masking, or anonymization when stored or transmitted.

(iii) Applicable Regulation. This is the identification of the regulatory or compliance requirements that apply to the data element or attribute, such as data protection, privacy, or retention laws. It should specify what actions or measures are taken to comply with the regulations, and what risks or penalties are involved in case of non-compliance. For example, HasPII (whether a value has Personally Identifiable Information) for Customer ID is 'No', while for Customer Address, it is 'Yes'.

The result of prompt augmentation at operation 114 is an augmented prompt, which is fed into the LLM 116 at operation 115 for metadata determination. Metadata determination can refer to metadata retrieval (from the vector database 102) and/or generation, based on the augmented prompt 114 and context 106 associated therewith. Namely, a metadata retrieval/generation agent generates metadata based on business name, business description, and/or business rules as described above; or performs word/phrase text matching against the vector database 102 based on business terms, data classification, and applicable regulation, also as described above.

Following operation 115 and metadata generation/retrieval, the method 100 proceeds to operation 118, which is metadata storage. The prompt augmentation agent and the metadata retrieval/generation agent both comprise part of an execution agent. The execution agent also performs metadata storage in operation 118. The execution agent is integrated with the front end of a data discovery engine to understand data context and interpret user intent, and with an enterprise data catalog to trigger an existing established approval process for the proposed metadata. More particularly, when a user performs the method 100, there are four major operations:

1. The user types free form text. The LLM is invoked to understand the user's "intent" and to perform a mapping to a "prompt template".

2. The "prompt template" comprises placeholders to permit augmentation with the particular dataset and/or data context 106. Specifically, the placeholder can identify the type of metadata to be determined (e.g. generate "Business Name") and data associated therewith, such as the dataset 104 (e.g. generate "Business Name" from "dataset 104") and the data context 106 (e.g. generate "Business Name" from "dataset 104", an example business name for dataset x is "context 106").

3. The resulting augmented prompt 114 is sent to the execution agent. The execution agent calls the LLM 116 with the augmented prompt to generate the appropriate values as described above in respect of the prompt templates for text generation and text matching.

4. The generated/retrieved information is sent to a data integration pipeline called "Metadata Capture service", that captures the generated metadata in respect of text generation and text matching as described above, matches with the technical column names and sends this to the dataset 104 and/or a data marketplace to enable data discovery by various users.

Collectively, the method 100 of FIG. 1 accordingly comprises an interactive user interface/API layer, which interfaces with users of the method 100 via an API and/or chatbot; an execution agent, which generates or retrieves metadata in response to user input in the form of an initial or augmented prompt, and which performs metadata storage. The user interface/API layer identifies gaps in business metadata and proposes contextual content, refines content proposed by the LLM, and provides feedback to improve the contextual information available for future use, such as in the context 106 or proprietary dataset 104. The execution agent comprises the LLM, such as the Falcon 40B™ LLM, and GPT-3.5 or GPT-4 from OpenAI™, the vector database 102, and a tool chain with a specific abstraction around a function or API to get augmented information. In respect of metadata storage, the execution agent leverages data understanding for data discovery and interprets user intent to generate appropriate data output, and connects with an enterprise data catalog to review, edit, approve, or reject the metadata output by the LLM. An example user interface is shown and described in reference to FIGS. 4A-4C.

As mentioned above, the various operations described above in respect of FIG. 1 are described using different agents. Operation 110 is performed using an embedding agent; operation 112 is performed using a planning agent; the initial prompt 108 and any augmented prompts 114 are generated using a prompt augmentation agent; the metadata is generated or retrieved by a metadata retrieval/generation agent at operation 115; and the generated/retrieved metadata is stored using an execution agent at operation 118. Both the prompt augmentation agent and the metadata retrieval/generation agent comprise part of the execution agent. Each of these agents comprises processor-executable computer program code that is stored on at least one non-transitory computer readable medium and that, when executed on a system such as that described in FIG. 5 below, performs the functionality of its associated operation 111, 112 as described above.

Figure 2:
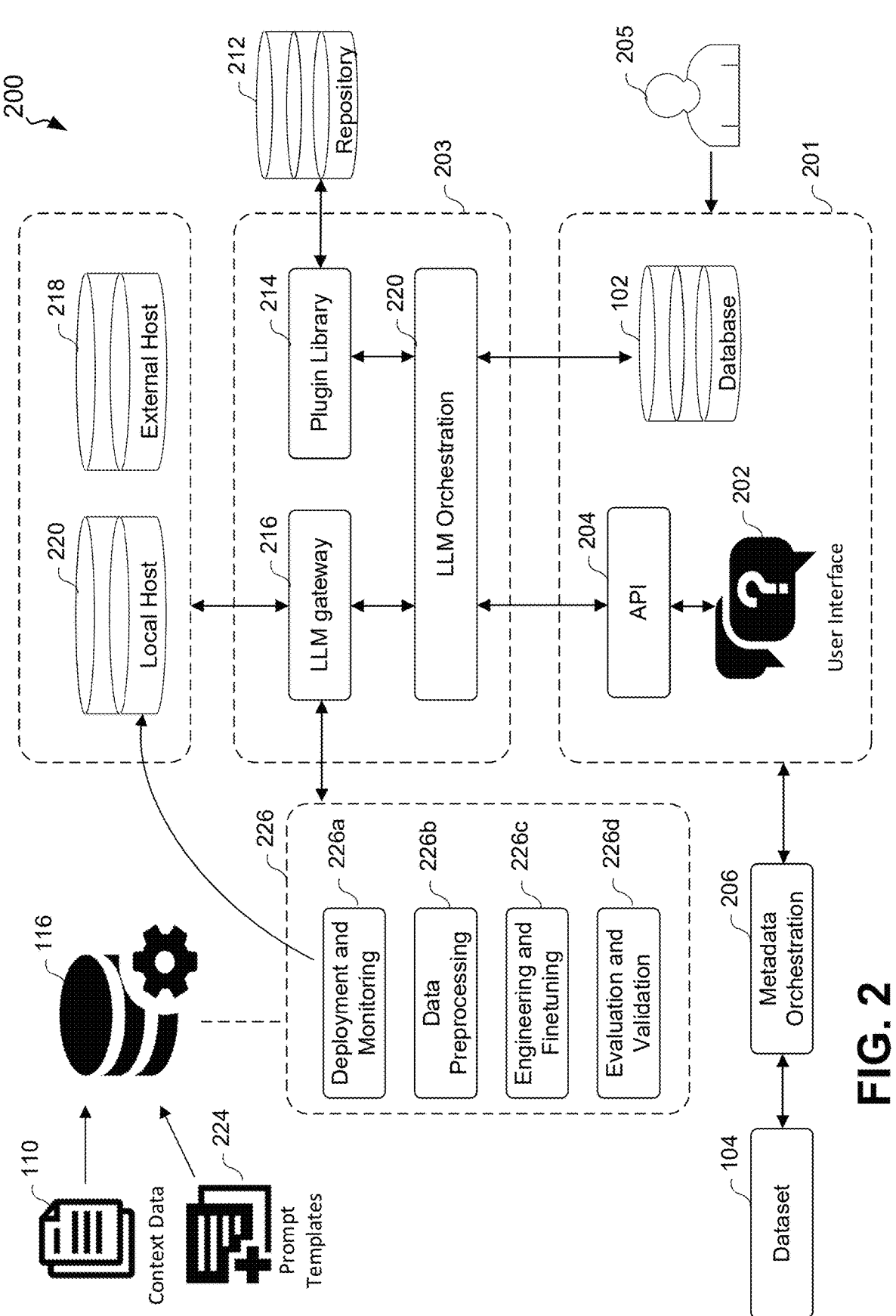
FIG. 2 depicts a system for metadata determination and storage, according to an example embodiment.

FIG. 2 depicts a system 200 for metadata determination and storage, according to an example embodiment. The system 200 may be used to perform the method 100 of FIG. 1. The system 200 of FIG. 2 comprises a data marketplace 201, with a user interface 202 (e.g. as described previously with reference to FIG. 1 as well as further herein), API endpoints 204, and the vector database 102.

The marketplace 201 is communicative with a metadata orchestrator 206 and the dataset 104 for which metadata is to be determined or generated. A user may select or provide the dataset 104 for metadata determination, for example via the user interface 202. The metadata orchestrator 206 can process the dataset 104 with the metadata orchestrator 206 so as to determine suitable prompt(s) to be generated, as described above. In particular, the dataset 104 can be processed for normalization, integration, and collection. Existing and missing metadata can be determined from the dataset 104, in addition to further information regarding the metadata to be determined and data associated therewith. In some embodiments, data owners and/or data analysts 205 can also access the marketplace 201 in order to gather insights from the dataset 104, determine metadata as described above, and/or to mange the stored data (e.g. vector database 102).

The API endpoints 204 and vector database 102 are communicative with an LLM operations platform 203, which comprise an LLM orchestrator 220 communicative with each of a plugin library 214 and an LLM gateway 216. That is, the API endpoints 204 are configured to communicatively couple the user interface 202 with LLM operations platform 203 by interfacing with the LLM orchestrator 220 as to enable access and communications to the LLM 116 for metadata determination. The LLM orchestrator 220 may be configured to prompt, chain, manage and monitor the LLM 116. The LLM orchestrator 220 can generate, modify and augment the prompt(s) for the LLM 116, as described above. Additionally, the LLM orchestrator 220 can monitor and manage LLM performance and resource consumption, as well as data transmitted to and from the LLM 116. In particular, the LLM orchestrator 220 is communicatively coupled to the vector database 102 as to permit the searching and retrieval of context information therefrom, as described above.

The plugin library 214 is communicative with data repositories 212, and the LLM gateway 216 is communicative with the LLM 116 for metadata determination, which can comprise one or more of locally hosted LLM(s) 220 and/or externally hosted LLM(s) 218. The plugin library 214 can be used to facilitate data integration, processing, and management from the data repositories 212.

The LLM 116 may be fine-tuned using fine tuning module 226, communicatively coupled to the LLM operations platform 203 via the LLM gateway 216. The fine tuning module 226 may receive data from the user interface 202 (e.g. dataset 104 and the generated prompt(s)), the vector database 102, and the repositories 212 for the fine tuning of the LLM 116. In particular, fine tuning module 226 can be configured to perform model evaluation and validation 226*d*, data preprocessing 226*b* (e.g. on the prompt(s) received), prompt engineering (e.g. by modifying and augmenting the prompt(s), as described above) and parameter fine tuning (e.g. to ensure suitable model performance) 226*c*. The fine tuning module 226 can deploy the LLM 116 as locally hosted LLM(s) 220 and/or externally hosted LLM(s) 218, once tuned, as well as monitor the activity and performance thereof.

In some embodiments, contextual information comprising the context 106 and various prompt templates 224 may be used to fine tune the LLM 116. Regardless, context data 110 and prompt templates 224 may also be used to generate the prompt provided to the LLM 116, such as for use with multishot learning, which may be augmented using metadata retrieved from the vector database 102 as described above in respect of FIG. 1.

Figure 3A:
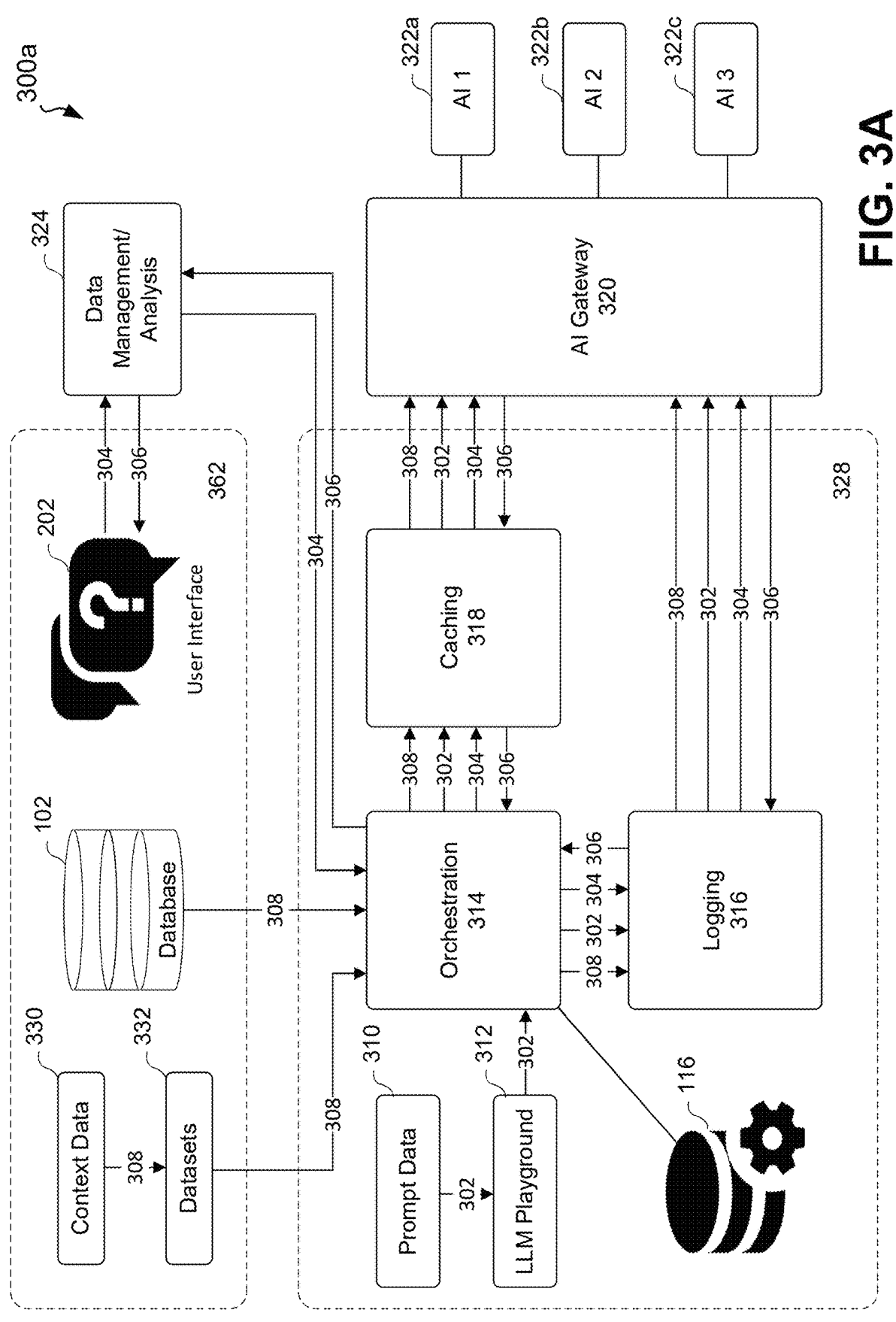
FIGS. 3A and 3B depict architectures for the system of FIG. 2, according to example embodiments.
Figure 3B:
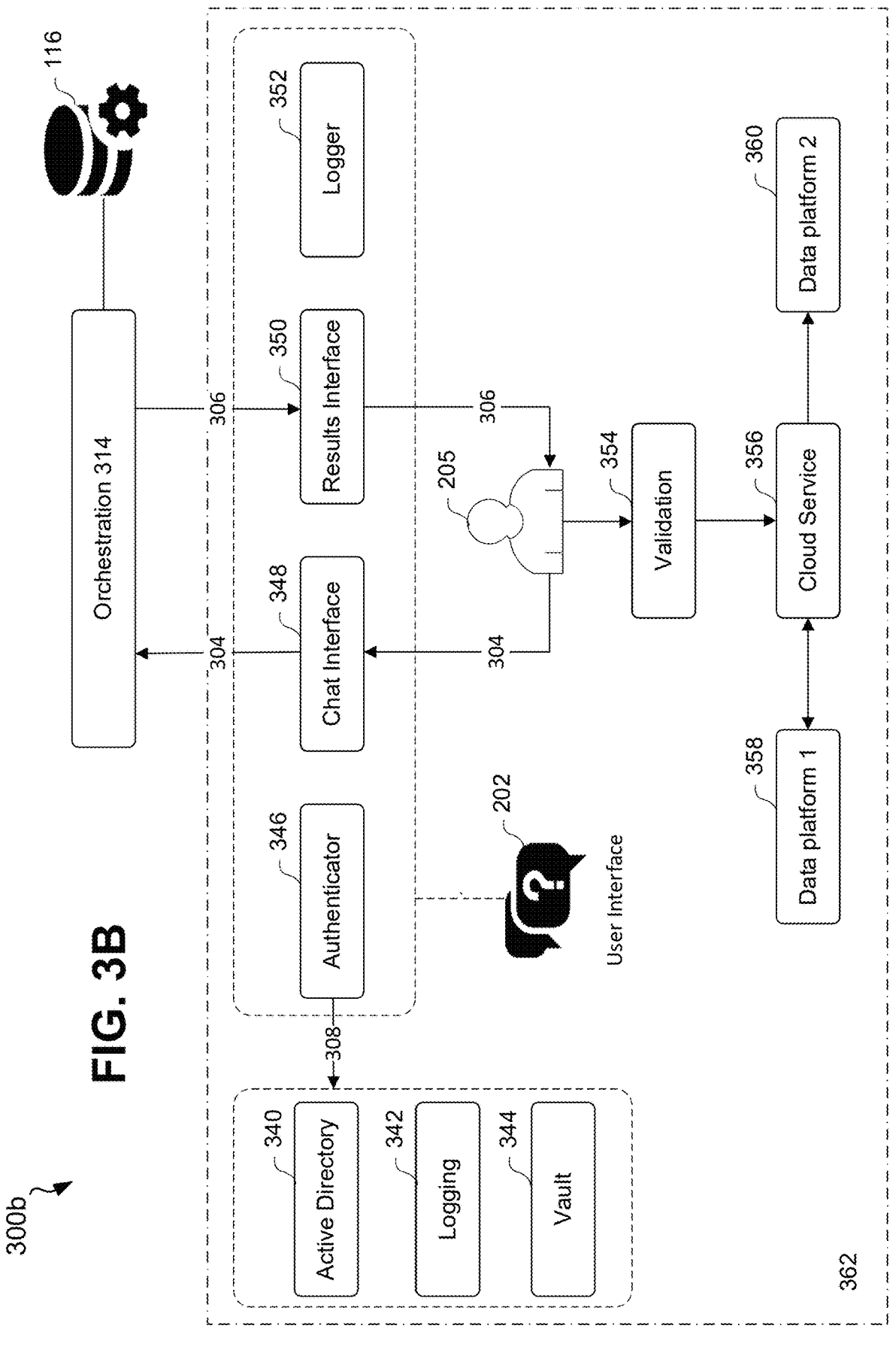

FIGS. 3A and 3B depict architectures 300*a* and 300*b* for the system of FIG. 2 in metadata determination and storage. As shown in FIGS. 3A and 3B, the various components of the system can be implemented a local/internal or physical server or database 362 and an external or cloud-based/hybrid server or database 328. However, alterative arrangements of the shown components of architectures 300*a*, 300*b* in different storage locations/implementations are also possible.

FIG. 3A depicts the various system components in respect to the external server 328 and FIG. 3B depicts the various system components in respect to the local server 362.

In FIGS. 3A and 3B, arrows 304 represent the flow of queries (e.g. for determination metadata) submitted by users of the system 300. As shown in FIG. 3A, a query is received at the user interface 202, implemented at the local server 362. The query can be first processed by data management/analysis platform 324, which may be a third-party data storage and management platform such as Snowflake™. The query can be sent to the LLM 116 implemented on the external server 328, for orchestration at 314, followed by caching (318) and logging (316). Caching 318 can be performed for data received and transmitted by the LLM 116 for more efficient data access and logging 316 can be performed for the same incoming/outgoing data to track/monitor/diagnosis/manage the data and LLM operations.

Arrows 308 represent the flow of contextual data (e.g. context data/information), which can be used to condition LLM outputs. Referring to FIG. 3A, context data/information 330 may comprise a plurality of proprietary datasets 332. Context data 330 particular to a specific organization or entity may be determined using the plurality of proprietary datasets 332, both of which are stored on the local server 362 for security purposes and case of management. For example, the context data 330 can comprise a plurality of terms, definitions, and/or descriptions relevant to the specific organization or entity, which can be utilized as references/examples for metadata determination. The context data 330 and/or the datasets 332 can be stored as vectors in the vector database 102 of the local server 362, as described above. The contextual data can be provided to the LLM 116 for orchestration at 314, followed by caching (318) and logging (316). For example, the data from the proprietary datasets 332 can be used to train/fine tune the LLM 116.

Arrows 302 represent the flow of data comprising prompt (s). In some embodiments, the flow off data represented by arrows 302 also comprise examples (e.g. few-shot examples) for use in determining metadata and for training or fine tuning the LLM 116. In particular, prompt data 310 comprising example prompt(s), prompt template(s), and/or example(s) can be utilized in a LLM playground 312 configured for experimentation and testing of the prompt data 310 for use in the LLM 116. For example, a suitable prompt/prompt template/example may be determined for use with a corresponding type or category of metadata. Similarly, prompt data 310 can be provided to the LLM 116 for orchestration at 314, followed by caching at 318 and logging at 316.

Once the query is received by the LLM 116 at orchestration 314. The query may be processed into a suitable prompt for the LLM 116. For example, the prompt comprising the query can be augmented using contextual data from the vector database 102, and prompt data 310 (e.g. prompt templates) can be used to modify the prompt to better suit the LLM 116 (e.g. by modifying the prompt to comprise placeholders corresponding to the metadata for determination), as shown in FIG. 3A. These data (302, 304, 308) can be cached (318) and logged (316) before interfacing with a plurality of AI platforms 322a, 322b, 322c through an AI gateway 320. The AI gateway 320 can be used for the management/monitor/analysis of data to and from the AI platforms 322a, 322b, 322c as well as the integration and access thereto. In some embodiments, the LLM 116 is implemented as one or more of the AI platforms 322a, 322b, 322c and the AI gateway 320 can also be used for the integration, management, deployment, and update of the AI platforms 322a, 322b, 322c for use as the LLM 116. The AI platforms 322a, 322b, 322c can be Azure OpenAI™, AWS Bedrock™, a proprietary LLM stored on the local server 328, or any other suitable AI platform.

As described above, the data provided to the LLM 116 can be comprised in one or more prompts such that the LLM 116 can determine the corresponding metadata. Arrows 306 represent the flow of the output metadata. As shown in FIG. 3A, the output metadata can be received from the LLM 116 through the AI gateway 320. The output metadata may be logged (316) and cached (318), as well as validated at orchestration 314 to ensure that the metadata is correct and suitable. The validated metadata can be processed by the data management/analysis platform 324 before being returned to the user via the user interface 202.

Referring now to FIG. 3B depicting architecture 300b showing components of the local server 362, the user interface 202 can comprise an authenticator 346, a chat interface 348, a results interface 350, and a logger 352. The chat interface 348 can receive queries and prompts from the user via natural language and/or text inputs, which are provided to the LLM 116 at orchestration 314, as represented by the arrow 304. The output metadata from the LLM 116, represented by the arrow 306, can be displayed on the results interface 350, which can depict the output metadata, the dataset for the metadata, the metadata storage/write location, as well as any data associated therewith. The logger 352 can monitor/track the data received at and transmitted from the user interface 202. The user interface 202 can be communicatively coupled to an active directory 340, local logger 342, and data vault 344 via an authenticator 346 to enable selective and authenticated data flow to and from the active directory 340, local logger 342, and data vault 344 via the user interface 202. In some embodiments, the contextual data can be sent to and received from the data vault 344. The active directory 340 can be used to interface the user interface 202 with the data vault 344 as well as other functionalities and services of the local server 362.

Data owners and/or data analysts 205 can interact with the LLM 116 via the user interface 202. The data owners and/or data analysts 205 can perform data analysis and management (e.g. on a particular proprietary dataset) using the user interface 202. Further, as depicted in FIG. 3B, the data owners and/or data analysts 205 can provide queries/prompts (304) and receive the output metadata (306). Additionally, any data used (e.g. the particular proprietary dataset) or received (e.g. output metadata) by the data owners and/or data analysts 205 can undergo validation (354) and processing by the cloud service/platform 356. Data can be received by the cloud service 356 from data platform 358, managed by data stewards, and may be implemented using Collibra™ as a data catalog platform/tool for performing data analytics. Data can also be sent from the cloud service 356 to the data platforms 358, 360. The data platform 360 can be implemented using Galileo™ for data processing and may be accessed by data consumers.

Figure 3C:
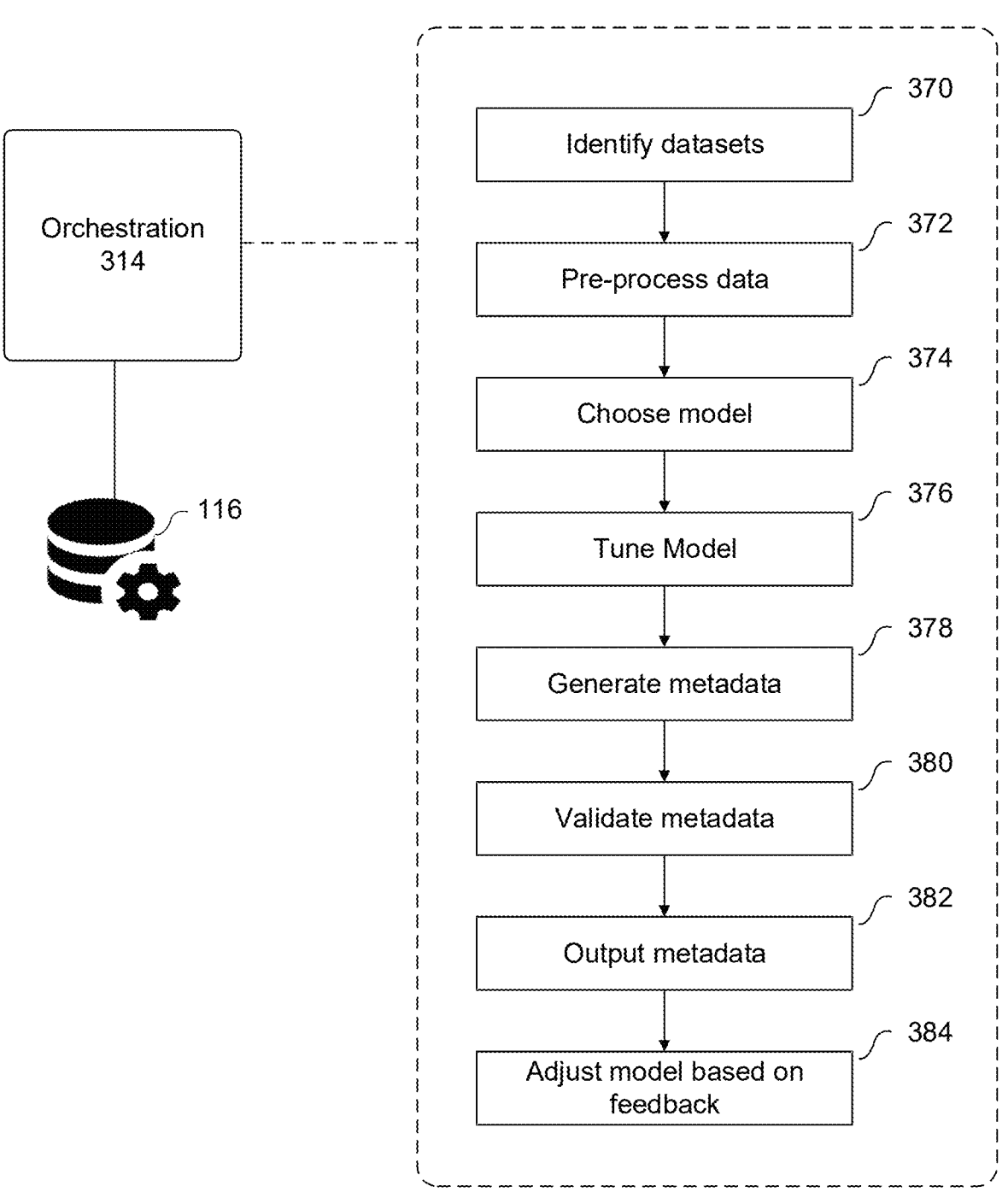
FIG. 3C depicts a process for performing large language model (LLM) orchestration, according to an example embodiment.

Depicted in FIG. 3C is a diagram showing example processes performed for the orchestration 314 of the LLM 116. At 370, datasets that can be used for the training and fine tuning (e.g. datasets comprising type(s) of metadata to be determined by the LLM 116) of the LLM 116 are identified, for example from the plurality of datasets 332. At 372, the datasets (and any received data) can be pre-processed, for example by cleaning the data to remove any sensitive information and stop words as well as formatting the data for use with the LLM 116. At 374, a suitable model is chosen for use as the LLM 116 (e.g. Falcon40B™, and GPT-3.5 or GPT-4 from OpenAI™). At 376, the LLM 116 can be fine tuned, for example using the datasets identified at 370. At 378, the LLM 116 can be used to generate/ determine the metadata according to the received query/ prompt, as described above. At 380, the generated metadata is validated, for example by data stewards, and may be approved or rejected. The generated metadata can be output at 382 (e.g. if validated/approved). For example, the meta- data may be stored in association with the dataset from which it is generated and/or may be stored/written within the dataset. In some embodiments, the LLM 116 can also undergo further testing and fine-tuning (384) to improve the metadata generation/determination by using feedback from the users (e.g. based on the generated metadata).

Figure 4A:
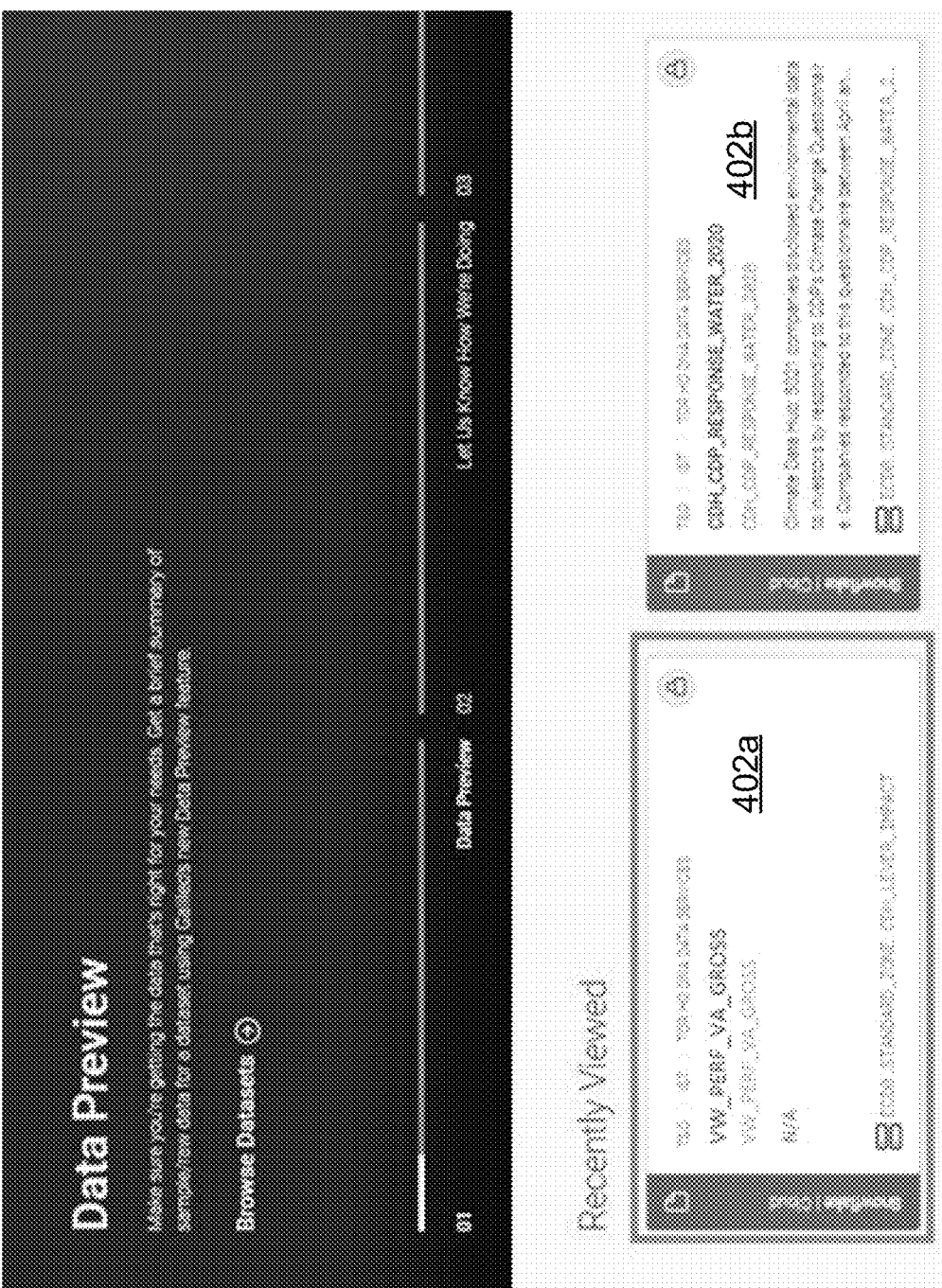
FIGS. 4A to 4C depict a user interface in the form of a chatbot during use of the system of FIG. 2 for metadata determination and storage.
Figure 4B:
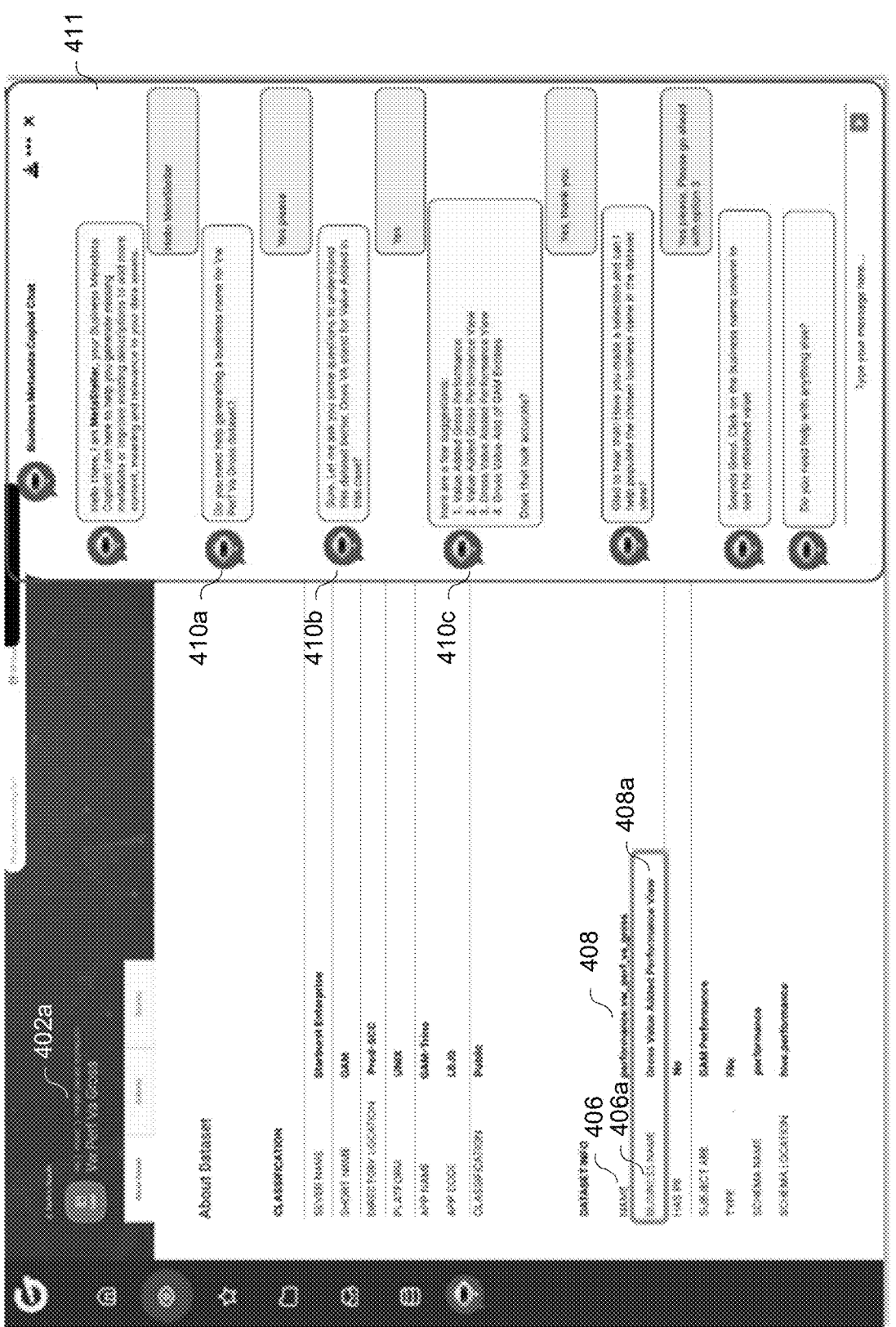
Figure 4C:
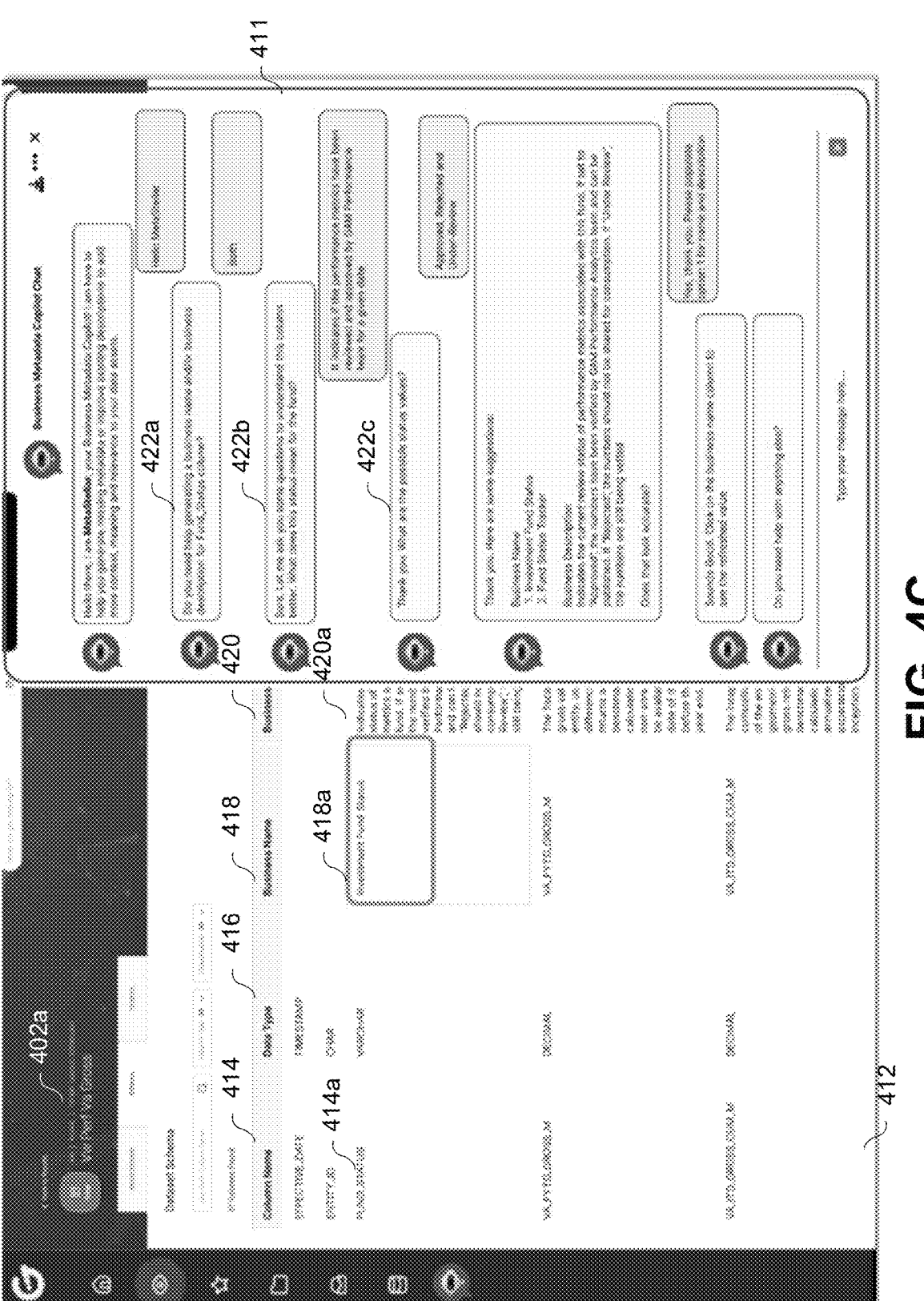

Referring now to FIGS. 4A to 4C, there are shown images from a user interface in the form of a chatbot during use of the system 200 of FIG. 2 for metadata determination and storage.

FIG. 4A depicts a screenshot where two different datasets 402a, b are shown to the user for which metadata is to be generated. In this example, the user graphically selects the first dataset 402a for metadata determination.

FIG. 4B depicts an user interface of the system 200 of FIG. 2 being used to generate "Business Name" metadata for that dataset 402a (e.g. once selected). The prompt augmen- tation agent interfaces with the user via a chat interface 411 to determine user intent, offer metadata names to the user, and to then store the generated metadata ("BUSINESS NAME" for "Gross Value Added Performance View") in the dataset 402a such that it becomes part of that dataset 402a and subsequently viewable with the dataset 402a is loaded. For example, the system identifies that a metadata entry corresponding to "Business Name" is missing (e.g. empty) for the dataset 402a. Through the chat interface 411, the system prompts the user by inquiring if they would like to generate metadata for the missing metadata entry (e.g. corresponding to the metadata type "Business Name").

As depicted in FIG. 4B, by interacting with the user via the chat interface 411, the system is able to gather additional information regarding the metadata for use in modifying and improving the prompt provided to the LLM 116 for metadata determination. For example, an initial query/prompt can be determined at 410a based on the dataset 402a for generating the metadata as well as the metadata to be generated ("BUSINESS NAME"). The query/prompt can be modified at 410b based on additional information (e.g. which can be utilized as additional query(-ies)/prompt(s)) associated with the metadata (e.g. definition of "VA"), for example using multishot learning. The system can also generate a plurality of potential metadata from the prompt(s), which can be provided to the user via the chat interface 411 (410c) as options. The user may choose, via the chat interface 411, a appropriate metadata from the provided options that is suitable as the metadata corresponding to the dataset 402a (e.g. suitable entry for the missing metadata entry corre- sponding to the "Business Name" metadata), which can be stored and entered into the dataset 402a. As depicted in FIG. 4B, a plurality of metadata fields 406 are associated with the dataset 402a. The metadata fields 406 can each correspond to a type/category/attribute (e.g. metadata descriptor) of a plurality of respective metadata 408 representing the specific metadata type/category/attribute for the dataset 402a. FIG. 4B is an example of metadata determination from freeform text, and more particularly generation of metadata 408a ("Gross Value Added Performance View") corresponding to the dataset 402a for the "Business Name" metadata field (406a).

FIG. 4C depicts another example of metadata determina- tion showing an alternative view of the user interface showing the dataset 402a comprising part of a spreadsheet. Here, the metadata is the "Business Name" and "Business Description" for respective cells in the spreadsheet corre- sponding to a column name of "FUND_STATUS" (414a). As in FIG. 4B, the system 200 of FIG. 2 interacts with the user via a textual chat to provide the user with options, and to receive feedback selecting the generated metadata as "Investment Fund Status". In particular, the chat interface 411 is used to interact with the user to gather information for generating suitable prompt(s) for metadata determination. For example, at 422a, the metadata to be determined ("Busi- ness Name" and "Business Description") is identified; at 422b, additional information corresponding to the data described by the metadata to be determined is identified (definition/purpose of the data described by the metadata); at 422c, acceptable values for the data described by the meta- data to be determined are identified ("approved", "rejected", and "under review"). The system can perform multishot learning and/or modify/improve the prompt to the LLM 116 using the identified information (e.g. the plurality of que- ries). For example, the system identifies that metadata entries corresponding to "Business Name" and "Business Description" are missing (e.g. empty) for the dataset 402a, in particular for data of type "FUND_STATUS". Through the chat interface 411, the system prompts the user by inquiring if they would like to generate metadata for the missing metadata entries (e.g. corresponding to the metadata type "Business Name" and "Business Description").

As depicted in FIG. 4C, the dataset 402a forms a part of a spreadsheet, in which a first column 414 comprises a plurality of different data or groups of a data, one of the data is (or is categorized as) "FUND_STATUS" 414a. Each of the data in column 414 has a corresponding data type, listed under column 416. Column 418 refers to the metadata fields of the data in the first column 414 corresponding to the type/category/attribute (e.g. metadata descriptor being "Business Name") of the data in the first column 414. Column 420 refers to the text description ("Business Description") of the data in the first column 414. Here, the execution agent stores the metadata in the cells of the spreadsheet (e.g. dataset 402a) directly for which the meta- data was generated, thereby overwriting the original (and unintuitive) or missing data stored in that cell. FIG. 4C is also an example of metadata determination from freeform text, and more particularly generation of the "Business Name" and "Business Description" metadata. Specifically, the "Business Name" metadata corresponding to the type/ category/attribute of the data "FUND_STATUS" is deter- mined to be and saved as "Investment Fund Status" (418a). The "Business Description" metadata corresponding to text description of the data "FUND_STATUS" is determined to be and saved as "Indicates the current review status of performance metrics associated with this fund. If set to be "Approved", the numbers have been verified by GAM Performance Analytics team and can published. If "rejected", the numbers should not be shared for consump- tion. If "Under Review", the numbers are still being vetted". As such, the determined metadata clearly incorporates infor- mation provided by the user (e.g. definition of "approved", "rejected", and "under review", identified by the user) as well as context information that is particular to the dataset 402*a* and/or the entity/organization associated therewith (e.g. "verified by GAM Performance Analytics team"). The system can generate a plurality of potential metadata from the prompt(s), which can be provided to the user via the chat interface 411 as options. Here, potential options for the "Business Name" metadata are displayed. The user may choose, via the chat interface 411, an appropriate metadata from the provided options that is suitable as the metadata corresponding to the dataset 402*a* (e.g. suitable entry for the missing metadata entry corresponding to the "Business Name" metadata), which can be stored and entered into the dataset 402*a*.

"What is the value of [HasPII] for the following dataset? The value of [HasPII] for 'FAC_CR_APP_PRO-D_RELTN_DLY' is: 'N.'"

Where the metadata to be determined is if the dataset comprises personally identifiable information. Specifically, if value of the field in the dataset "[HasPII]", corresponding to whether the personally identifiable information, should be "Y" (for containing personally identifiable information), or "N" (for not containing personally identifiable information).

The prompt structure for the above question for PII classification follows:

```
{
'Data Set Name': 'ADDR',
'Business Name': 'ADDRESS',
'Business Description': 'This table provides the mailing address for the accounts of a
client. There is an attribute Address Source in this table. If the account has an address,
the Address Source is "A". If no account address exists, the Address Source will be
"C", the primary client's address.NOTE: It is not possible to see the correct mailing
address for Visa accounts if it is different from the client's mailing address.
Source Systems: SRF',
'Source System': 'DWE',
'Data Set Format': 'View',
'Storage Type': 'database',
'Data Classification': 'Confidential',
'HasPII': '[HasPII]'
}
/* This is the multishot learning example #1 of the SCHEMA. Several of these examples can
be added. */
```

Example Prompts

The following provide examples of prompt engineering that may be used when interfacing with the execution agent and, more particularly, the LLMs.

Generally speaking, prompt engineering is a way to craft prompts to the LLM (e.g. LLM 116) that shape the overall structure and style of the response. Essentially, the LLM's coherence can be modified using this technique. Multishot learning is an example of a prompt engineering technique.

Multishot learning involves giving structured examples to the LLM to help it understand logical patterns that can guide the next response. This takes advantage of the in-context learning ability that LLMs provide. This is not considered fine-tuning, as the learning is only held for that particular session with the LLM. LLMs have limited context windows, and once the initial reference to this "knowledge" exceeds the context window, the context will no longer be applied.

In at least some of the example embodiments herein, multishot learning is used in a similar manner but with a more complex schema. For structured metadata (e.g. determining metadata for a portion of a dataset such as a cell corresponding to a group of data in cells), JSON information with a defined schema can be provided so that the LLM can learn to interpret it. This helps the LLM understand the appropriate information to add to the value of the field that is desired.

For example, a question (e.g. prompt 108) to the LLM may be, "Predict if the dataset: FAC_CR_APP_PRO-D_RELTN_DLY has Personal Identifiable Information." The response/output from the LLM may then be, As seen in the example, it is possible to also represent the dataset 104 in a different form by describing the data comprised therein rather than including the dataset itself in the prompt 108. Here, the dataset "ADDR" is augmented to the prompt as an example for the LLM.

Another prompt can be sent to the LLM to provide additional information corresponding to the type of metadata to be determined as a part of prompt engineering. For example:

"Personal Identifiable Information means it can identify who the individual is by making use of name, email id or a combination of address and account number. Available Options are Y which means yes and N which means No".

As shown, the additional prompt elaborates on the metadata as well as defined acceptable outputs for the metadata. Alternatively, the first prompt can be modified to include the additional information.

The additional prompt may also include the expected (correct) answer (e.g. metadata):

"the value of [HasPII] for 'ADDR' is: 'N.'".
/*This is the multishot learning example #1 of the INSTRUCTIONS and RESPONSE. Again, several of these examples can be added.*/

Further, the prompt can comprise the dataset information. The dataset for which metadata is to be determined can be represented using JSON. The structure and schema for the (portion of) the prompt can be the same as in the learning examples, as shown below.

What is the value of [HasPII] for the following dataset?

```
{
'Data Set Name': 'FAC_CR_APP_PROD_RELTN_DLY',
'Business Name': 'FACILITY CR APP PRODUCT RELTNSHP - DLY',
```

```
'Business Description' : 'FACILITY CR APP PRODUCT RELTNSHP - DLY',
'Source System': 'DWE',
'Data Set Format': 'View',
'Storage Type': 'database',
'Data Classification': 'Confidential',
'HasPII': '[HasPII]'
}
/* This is the JSON representation of the actual dataset for which metadata is to be
generated. The structure and schema is the same as in the learning examples. */
```

An additional prompt may be added to provide additional information for the metadata, as described above. Alternatively, the prompt can be modified to include the additional information. For example, the additional information to be included in the prompt may be:

"Personal Identifiable Information means it can identify who the individual is by making use of name, email id or a combination of address and account number. Available Options are Y which means yes and N which means No".

The prompt can also include the expect format of the output from the LLM, which can correspond to a template given to the LLM for ease of processing by the LLM, as shown below.

"the value of [HasPII] for 'FAC_CR_APP_PRO-D_RELTN_DLY' is:".

Sometimes, the LLM (e.g. LLM 116) may not return the correct result. It might incorrectly classify a sentence, especially if it is complex, ambiguous, or if the LLM needs further information. For example, in text classification, consider classifying a sentence such as: "The company's financial performance is impressive, but there are rumors of potential accounting irregularities."

Because the LLM lacks specific knowledge on the company in the example, it would have a difficult time giving an accurate assessment that is reflective of the context in this situation. Similarly, because the LLM is trained on general data, it often does not provide results with the appropriate relevance, detail or veracity expected of enterprise quality metadata.

However, better results can be obtained by leveraging the vector database 102 as described above in respect of FIGS. 1-3C. By turning a store of knowledge (e.g., the proprietary datasets) into vector embeddings that are grouped by semantic similarity, relevant information can be retrieved that can be used to inform the LLM with:

(a) Contextual understanding: a broad view of the structure and operating environment of an organization/entity for which the metadata pertains to.

(b) Fact verification: retrieve internal definitions and reference truth stores.

(c) Lexical patterns: generate labels and descriptions that better match the organization's business terminology.

(d) Domain-specific knowledge: a narrow view of specific processes, practices and rules within the organization.

Embedding the proprietary datasets into the vector database 102 for use in the LLM (e.g. LLM 116) allows the LLM to leverage this information when generating metadata.

Retrieval augmented generation is a process where the relevant information, given as a query result from the vector database 102, is inserted back into the LLM prompt so as to generate the augmented prompt (e.g. as contextual data 106 and described above). This is a way to improve the quality, relevance, and information content of the existing multishot prompt that does not have access to the vector database 102. This allows the LLM to generate responses that are both coherent and accurate. In at least some of the example embodiments herein, the goal is retrieve semantically relevant examples at runtime when the user selects the fields for which they would like to generate metadata.

The following provides examples of multishot learning when generating metadata in respect of a "business description", shown as prompt(s) to the LLM. As seen below, the "[DESCRIPTION]" is a placeholder for generating the metadata.

Example 1

This is metadata from the Organization. When asked about the value of [DESCRIPTION], answer with an appropriate "field description" with a detailed description of the business name that teaches me what it is by referring to the JSON. Here's an example:

```
/* Irrelevant multishot learning example: */
{
"dataset name": "universal-client-profile-pcb-v2",
"dataset business_name": "dms-datastore-universal-client-profile-pcb-v2",
"description": "EDL to AWS (LECT) Egress ingestion of Universal Clients Profile v2.0
to obtain client level and profile level metrics on various facets of a client at
Organization",
"business metadata":
{
"field name": "CC_VISA_CLSICII_PR_IND",
"business name": "Open Signature Rewards Visa (Previously Visa Classic Ii) Account
Primary Indicator",
"data type": integer,
"field description of business name": [DESCRIPTION]
}
}
What is the value of [DESCRIPTION] for the 'CC_VISA_CLSICII_PR_IND'?
Answer: the detailed value of [DESCRIPTION] for 'CC_VISA_CLSICII_PR_IND' is:
"this field represents an indicator that the client is a primary account holder for an open
```

```
Signature rewards visa (previously visa classic II) accounts."
/* Field to be completed: */
What is the value of [DESCRIPTION] for the following dataset?
{
"dataset name": "MORTG_COMT_DLY",
"dataset business_name": "CR APP MORTGAGE COMMITMENT - DLY",
"description": "This table is a view of the EDW table for BI query purposes",
"business metadata":
{
"field name": "CSH_BACK_AMT_PCT_OF_MORTG",
"business name": "CASH BACK AMOUNT PERCENTAGE OF MORTGAGE",
"data type": decimal,
"field description of business name": [DESCRIPTION]
}
}
What is the value of [DESCRIPTION] for the 'CSH_BACK_AMT_PCT_OF_MORTG'?
Answer: the detailed value of [DESCRIPTION] for
'CSH_BACK_AMT_PCT_OF_MORTG, which stands for 'CASH BACK AMOUNT
PERCENTAGE OF MORTGAGE' is: "this field represents'"
```

Example 2

This is metadata from the Organization. When asked about the value of [DESCRIPTION], create an appropriate "field description" with a detailed description of the business name and its use within the business ONLY by referring to the JSON. Here's an example:

```
{
"dataset name": "MORTG_COMT_DLY",
"dataset business_name": "CR APP MORTGAGE COMMITMENT - DLY",
"description": "This table is a view of the EDW table for BI query purposes",
"business metadata":
{
"field name": "CSH_BACK_AMT_PCT_OF_MORTG",
"business name": "CASH BACK AMOUNT PERCENTAGE OF MORTGAGE",
"data type": decimal,
"field description of business name":
}
}
What is the value of [DESCRIPTION] for the 'CSH_BACK_AMT_PCT_OF_MORTG'?
Answer: the detailed value of [DESCRIPTION] for
'CSH_BACK_AMT_PCT_OF_MORTG', which stands for 'CASH BACK AMOUNT
PERCENTAGE OF MORTGAGE', is: "The Cash Back Amount Percentage of Mortgage
is the Cash Back Amount expressed as a percentage of the total mortgage amount. Valid
values: Rate Percentage 0 - 99.9999999%"
/* Field to be completed: */
What is the value of [DESCRIPTION] for the following dataset?
{
"dataset name": "MORTG_COMT_DLY",
"dataset business_name": "CR APP MORTGAGE COMMITMENT - DLY",
"description": "This table is a view of the EDW table for BI query purposes",
"business metadata":
{
"field name": "CSH_BACK_AMT_PCT_OF_MORTG",
"business name": "CASH BACK AMOUNT PERCENTAGE OF MORTGAGE",
"data type": decimal,
"field description of business name": [DESCRIPTION]
}
}
What is the value of [DESCRIPTION] for the 'CSH_BACK_AMT_PCT_OF_MORTG'?
Answer: the detailed value of [DESCRIPTION] for
'CSH_BACK_AMT_PCT_OF_MORTG, which stands for 'CASH BACK AMOUNT
PERCENTAGE OF MORTGAGE' is: "this field represents"
```

In the above examples, the user's intention is to generate metadata comprising a "business description" for the field "Cash back amount percentage of mortgage". Two prompts are provided to the LLM, shown respectively as Examples 1 and 2. The prompt of Example 2 was augmented with relevant information comprising contextual data in the form of example metadata of the same type and the corresponding dataset. In contrast, the prompt for Example 2 is augmented with an irrelevant example as contextual data, although the same type of contextual data was added. The ideal answer, which matches the organization's definition for the dataset in question is, "This field represents the cash back amount of mortgage as a percentage of the total mortgage amount. Valid values: Rate Percentage 0-99.9999999%"

In Example 1, the LLM's response is, "This field represents the cash back amount percentage of mortgage, which is the percentage of the mortgage amount that a customer will receive in cash back after closing." In contrast, the LLM's response for Example 2 is, "This field represents the cash back amount of mortgage as a percentage of the total mortgage amount. Valid values: Rate Percentage—99.9999999%".

Accordingly, when using an irrelevant example, the LLM does return a definition that makes sense as a description. However, it is quite generic and is not accurate to the context it falls under, as seen in Example 1. And in contrast, once the prompt has been augmented with the relevant information, the LLM is able to return an accurate definition, as seen in Example 2.

The vector database 102 accordingly gives the system 200 the ability to alter content of the multishot learning prompt in real time. It can be considered a dynamic enhancement to the static prompt template design that makes it relevant for different scenarios. In at least some of the example embodiments, prompt engineering as described herein provides a base structure, and prompt augmentation permits adaptation of the prompt to the user input.

Figure 5:
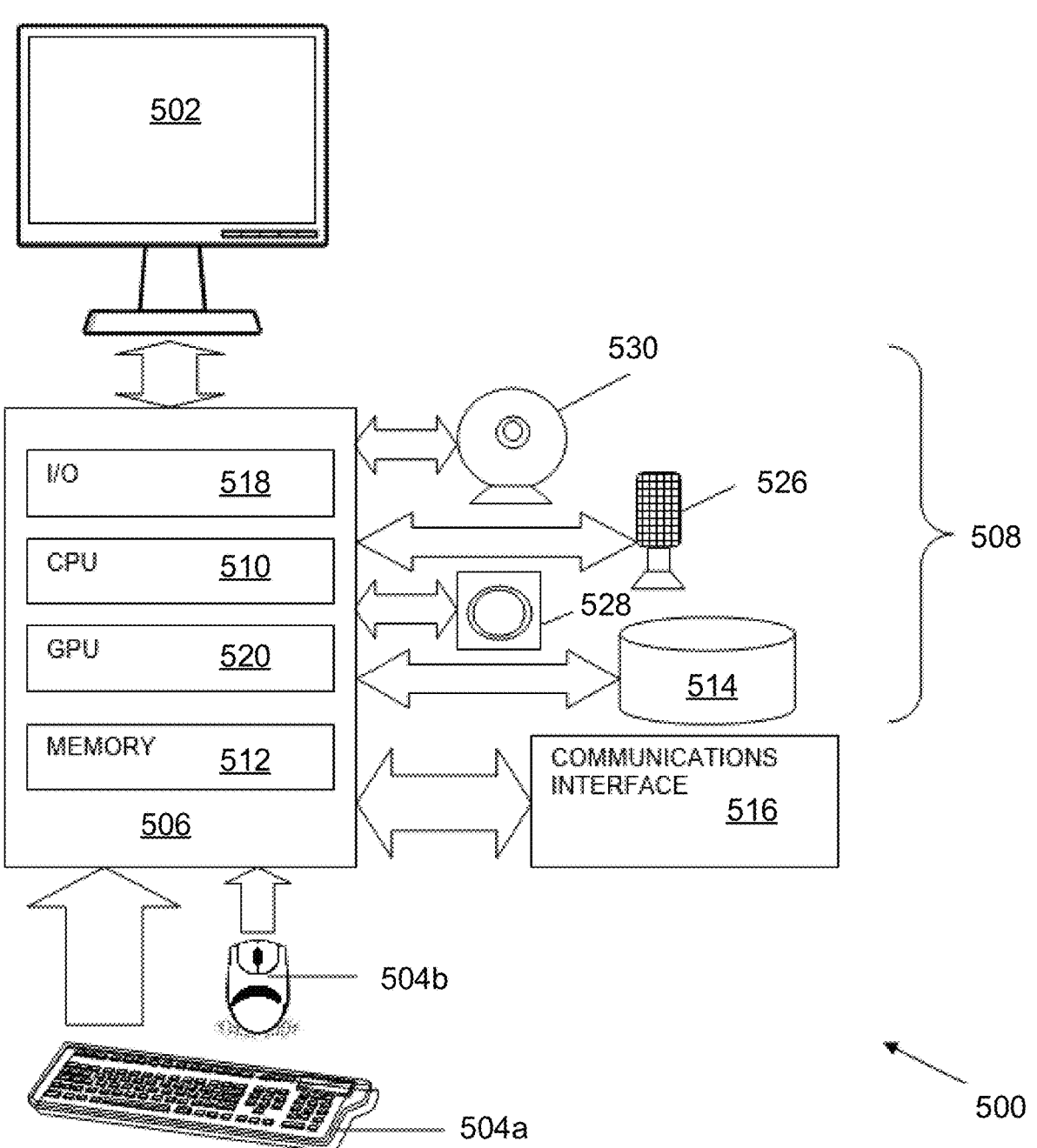
FIG. 5 depicts a computer system that may be used to perform the method for metadata determination and storage of FIG. 1, and to implement the system for metadata determination and storage of FIGS. 2 and 3.

An example computer system in respect of which system and method described above may be implemented is presented as a block diagram in FIG. 5. The example computer system is denoted generally by reference numeral 500 and includes a display 502, input devices in the form of keyboard 504a and pointing device 504b, computer 506 and external devices 508. While pointing device 504b is depicted as a mouse, it will be appreciated that other types of pointing devices, or a touch screen, may also be used.

The computer 506 may contain one or more processors or microprocessors, such as a central processing unit (CPU) 510. The CPU 510 performs arithmetic calculations and control functions to execute software stored in a non-transitory internal memory 512, preferably random access memory (RAM) and/or read only memory (ROM), and possibly additional memory 514. The additional memory 514 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 514 may be physically internal to the computer 506, or external as shown in FIG. 5, or both. The additional memory 514 may also comprise the EDL and/or EDW referenced above.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 514 for execution by the one or more processors or microprocessors to effect neural network pre-training, training, or use of a trained network for inference.

The computer system 500 may also include other similar means for allowing computer programs or other instructions to be loaded. Such means can include, for example, a communications interface 516 which allows software and data to be transferred between the computer system 500 and external systems and networks. Examples of communications interface 516 can include a modem, a network interface such as an Ethernet card, a wireless communication interface, or a serial or parallel communications port. Software and data transferred via communications interface 516 are in the form of signals which can be electronic, acoustic, electromagnetic, optical or other signals capable of being received by communications interface 516. Multiple interfaces, of course, can be provided on a single computer system 500.

Input and output to and from the computer 506 is administered by the input/output (I/O) interface 518. This I/O interface 518 administers control of the display 502, keyboard 504a, external devices 508 and other such components of the computer system 500. The computer 506 also includes a graphical processing unit (GPU) 520. The latter may also be used for computational purposes as an adjunct to, or instead of, the (CPU) 510, for mathematical calculations.

The external devices 508 include a microphone 526, a speaker 528 and a camera 530. Although shown as external devices, they may alternatively be built in as part of the hardware of the computer system 500.

The various components of the computer system 500 are coupled to one another either directly or by coupling to suitable buses.

Figure 6:
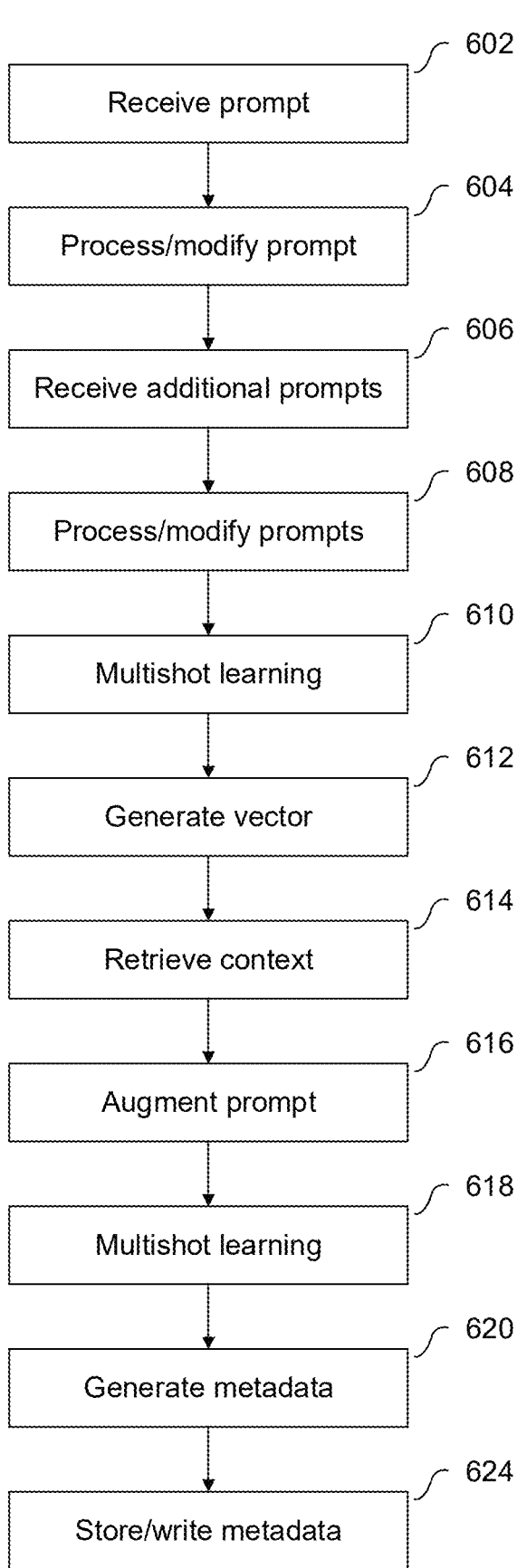
FIG. 6 depicts a method of generating metadata for data population, according to an example embodiment.

FIG. 6 depicts an example method for generating or determining metadata, corresponding to the method of FIG. 1 and can be implemented using the system of FIG. 2. At the system, an indication to generate metadata may be received, for example as a prompt (602). The dataset for which metadata is to be generated can be identified by the system or provided by the user (e.g. a spreadsheet). At 604, the system may process the indication and/or the dataset to determine a particular metadata to be generated, which corresponds to information representative of an attribute of the dataset (e.g. a type of metadata or a metadata field). Based on the metadata type, the prompt can be modified according to (e.g. conform to) a corresponding prompt template of a plurality of pre-set prompt templates, each of which may correspond to a particular metadata type. The prompt can also be modified to comprise one or more placeholders, where the placeholder can correspond to the metadata to be generated, metadata type, dataset information, and/or information regarding the metadata or data described by the metadata.

In some embodiments, additional information pertaining to the metadata may be added to the prompt as additional prompts or modifications to the prompt at 606. Additional information can be determined by the system from the dataset or according to the metadata type (e.g. each metadata type having associated therewith a set of additional information) or can be provided by the user via prompt(s) or interaction(s) with the system. The prompt(s) along with the received additional information can be processed and modified (608), as performed at 604. At 610, multishot learning can be performed using the additional information, the prompt(s), and/or the dataset, as described above.

A query vector can be generated at 612, for example using a LLM from the prompt(s). At 614, contextual information relevant to the metadata can be retrieved from a vector database comprising contextual data represented using vectors. The contextual information may pertain to a specific organization or entity and may be retrieved by performing a similarity search (e.g. a cosine similarity search or a nearest neighbor search) between the query vector and the stored contextual data, the results of which can be ranked to determine the contextual information to be retrieved. The contextual information can comprise an example dataset as well as example metadata of the same metadata type as the metadata to be generated. The retrieved contextual information can be used to augment the prompt(s) at 616, for example by appending the contextual information to the prompt(s) as example(s). Multishot learning can also be performed on the contextual information and the prompt(s) at 618.

The augmented prompt(s) can be input to a LLM to generate the desired metadata at 620. The system can also store the metadata in association with the dataset (624). For example, the system can store the metadata in the dataset, particularly in a metadata field for the specific metadata type. Specifically, if the data corresponding to the generated metadata forms a part of a spreadsheet such that the generated metadata describes a data entry of a cell or a group of cells in the spreadsheet, the metadata can be stored in a cell of the spreadsheet (e.g. overwriting the cell).

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference to "an LLM" or "the LLM" does not exclude embodiments in which multiple LLMs are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means A, B, C, A and B, A and C, B and C, or A, B, and C.

It is contemplated that any part of any aspect or embodiment discussed in this specification can be implemented or combined with any part of any other aspect or embodiment discussed in this specification, so long as such implementation or combination is not performed using mutually exclusive parts.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for generating metadata for data population, the method comprising:
   (a) receiving, at a large language model implemented using at least one artificial neural network, a prompt comprising a query for generating the metadata, wherein the metadata is in respect of data comprising part of a dataset and corresponds to information representative of an attribute of the dataset;
   (b) augmenting the prompt with context comprising metadata descriptors by processing information in the query, comprising:
      (i) generating a query vector from the prompt using the large language model; and
      (ii) retrieving the context relevant to the metadata from a vector database comprising context represented as vectors, wherein the retrieving comprises performing a similarity search on the vector database relative to the query vector;
   (c) determining the metadata in response to the query by processing the augmented prompt and the dataset with the large language model; and
   (d) storing the determined metadata in relation to the dataset, wherein the metadata is stored in association with the data and the attribute.

2. The method of claim 1, further comprising: modifying the prompt to comprise at least one placeholder corresponding to a type of the metadata to be determined by the large language model.

3. The method of claim 2, wherein each placeholder of the at least one placeholder is associated with respective context data.

4. The method of claim 2, wherein the prompt is modified according to a template comprising information pertaining to the metadata, and wherein the template corresponds to a format of the prompt.

5. The method of claim 4, wherein the prompt template comprises acceptable values for the data and/or definitions for terms associated with the metadata.

6. The method of claim 1, wherein the similarity search comprises a cosine similarity search or a nearest neighbor search between the query vector and the context data.

7. The method of claim 1, wherein the retrieving further comprises ranking results of the similarity search.

8. The method of claim 1, further comprising: (a) generating and storing the vectors representing the context in the vector database as to populate the vector database, wherein the context corresponds to metadata and datasets of a particular entity, group, or organization.

9. The method of claim 1, wherein the context comprises example metadata and data associated with a dataset corresponding to the example metadata.

10. The method of claim 1, wherein the prompt comprises at least one of business name, business description, or business rules, and wherein the metadata is determined by text generation.

11. The method of claim 1, wherein the prompt is received via an application programming interface or wherein the prompt is received via a textual chat interface.

12. The method of claim 11, further comprising:
(a) identifying one or more missing metadata entries in the dataset; and
(b) displaying the identified one or more missing metadata entries for selection by a user for metadata generation.

13. The method of claim 11, wherein determining the metadata comprises generating a plurality of potential metadata entries for selection by a user as the determined metadata.

14. The method of claim 1, wherein the prompt comprises multiple prompts received by the large language model, wherein multishot learning is performed by the large language model using the multiple prompts.

15. The method of claim 1, wherein multishot learning is performed by the large language model with the prompt and the context to determine the metadata.

16. The method of claim 1, wherein the data is stored in a spreadsheet, and wherein the generated metadata is stored in a cell of the spreadsheet.

17. The method of claim 16, wherein the generated metadata describes a data entry of a cell or a group of cells in the spreadsheet, and wherein the metadata is stored by overwriting the data entry.

18. A metadata determination and storage system, the system comprising:
(a) a vector database;
(b) at least one communications interface;
(c) at least one processor communicatively coupled to the at least one communications interface and to the vector database and configured to perform a method for generating metadata for data population, the method comprising:
(i) receiving, at a large language model implemented using at least one artificial neural network, a prompt comprising a query for generating the metadata, wherein the metadata is in respect of data comprising part of a dataset and corresponds to information representative of an attribute of the dataset;
(ii) augmenting the prompt with context comprising metadata descriptors by processing information in the query, comprising:
generating a query vector from the prompt using the large language model; and
retrieving the context relevant to the metadata from a vector database comprising context represented as vectors, wherein the retrieving comprises performing a similarity search on the vector database relative to the query vector;
(iii) determining the metadata in response to the query by processing the augmented prompt and the dataset with the large language model; and
(iv) storing the determined metadata in relation to the dataset, wherein the metadata is stored in association with the data and the attribute.

19. At least one non-transitory computer readable medium having stored thereon computer program code that is executable by at least one processor, wherein when executed the computer program code causes the at least one processor to perform a method for generating metadata for data population, the method comprising:
(a) receiving, at a large language model implemented using at least one artificial neural network, a prompt comprising a query for generating the metadata, wherein the metadata is in respect of data comprising part of a dataset and corresponds to information representative of an attribute of the dataset;
(b) augmenting the prompt with context comprising metadata descriptors by processing information in the query, comprising:
(i) generating a query vector from the prompt using the large language model; and
(ii) retrieving the context relevant to the metadata from a vector database comprising context represented as vectors, wherein the retrieving comprises performing a similarity search on the vector database relative to the query vector;
(c) determining the metadata in response to the query by processing the augmented prompt and the dataset with the large language model; and
(d) storing the determined metadata in relation to the dataset, wherein the metadata is stored in association with the data and the attribute.

20. The method of claim 1, wherein the prompt comprises at least one of business terms, data classifications, or whether the data is subject to legal regulations, and wherein the metadata is determined by text matching.

* * * * *